O. H. BURSELL.
BALL CAGE FOR BALL BEARINGS.
APPLICATION FILED APR. 3, 1919.
1,305,875.
Patented June 3, 1919.
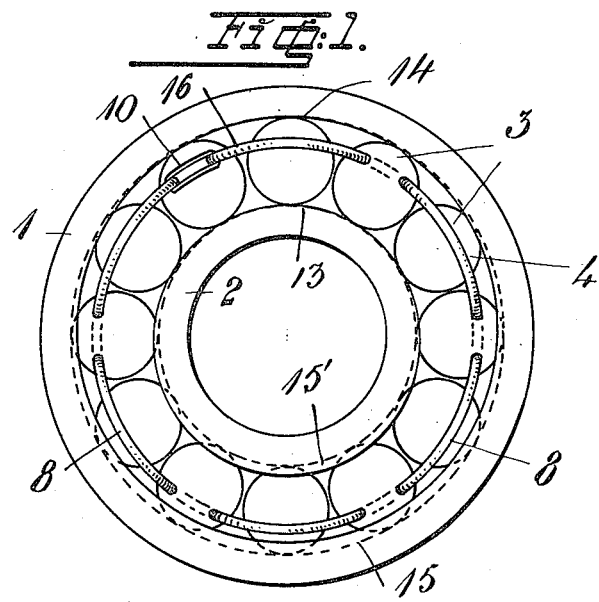
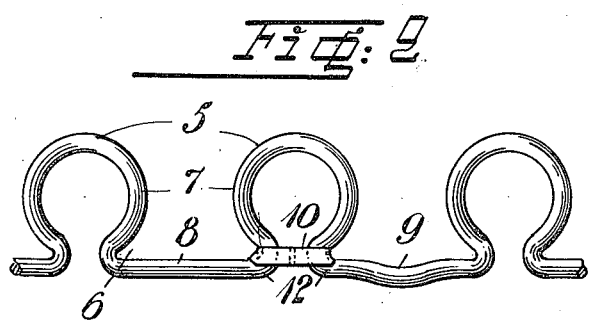
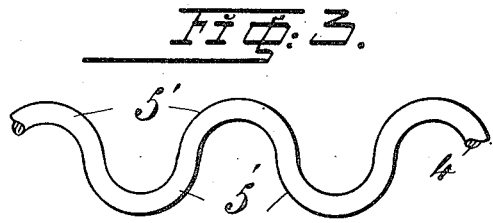
INVENTOR:
Olof Henning Bursell
By Wm Wallace White
ATTY.

UNITED STATES PATENT OFFICE.

OLOF HENNING BURSELL, OF ÖREBRO, SWEDEN.

BALL-CAGE FOR BALL-BEARINGS.

1,305,875.  Specification of Letters Patent.  Patented June 3, 1919.

Application filed April 3, 1919. Serial No. 287,326.

*To all whom it may concern:*

Be it known that I, OLOF HENNING BURSELL, subject of the King of Sweden, residing in Alnängsgatan, 2°, Örebro, in the Kingdom of Sweden, have invented certain new and useful Improvements in Ball-Cages for Ball-Bearings, of which the following is a specification.

The object of the present invention is a ball cage for ball bearings consisting of a wire that is bent in a closed circle around the bearing and formed with loops or bends for the guiding of the balls.

In cages for balls previously known as made of wire these loops or curvatures have been arranged in such a way, that when the ball cage has been embodied in the bearing, the loops or curvatures lie in radial planes in the direction of the axis i. e. that each loop has been located between two adjacent balls in the ball series and has formed support for these.

According to the present invention, on the contrary, the loops are arranged so that they are parallel to or chiefly parallel to the circumference of the inner ring i. e. the loops are substantially parallel and concentric to the corresponding element of the circumference of the inner ring.

In order to illustrate the invention, there is shown an example in the accompanying drawing of a form of it. Figure 1 shows a side view of the ball cage embodied in a bearing and Fig. 2 shows part of the ball cage spread in a plane. Fig. 3 shows in the same manner as Fig. 2 another form of the ball cage. According to the form of manufacture shown in Figs. 1 and 2, the loops forming chiefly a closed circle are arranged so that they serve as a support or rest for every second ball of the ball series, whereas every second ball is received by the interval between two adjacent loops.

1 indicates the outer ring and 2 the inner ring, and 3 the balls running in the races of the outer and inner rings, and 4 the ball cage. This is formed of wire, bent out with loops 5 parallel or substantially parallel to the corresponding element of the circumference of the inner ring, which loops practically form closed rings of a lesser diameter than the balls and are arranged at such a distance from each other that they make a support for every second ball in the ball series, whereas every second ball is received by the interval 6 between the annular loops 5. In this position, these balls will lie close to the opposite outer sides 7 of the annular loop 5 and of the part 8, which connects the loops 5. The said part 8 may be provided with a bent out curved portion 9 as is shown to the right in Fig. 2, in order to make a better support for the balls. The parts 8 may be straight so that the ball cage seen from the side forms a polygon, or else the parts 8 may as shown by Fig. 1, be bent along the arc of a circle with the center lying in the central line of the bearing (axis). As a means to give the loops 5 an increased steadiness they may, at the bent places 12, near the connecting parts 8, be inclosed by clamps 10, rings or similar contrivances, which give an increased strength to the ball cage. The construction of this type of ball cage is particularly simple and at the same time it is well adapted to its purpose.

According to the form of the invention shown in Fig. 3, the ball cage is finished with equilateral bent out curvatures 5' passing on both sides of a transverse central plane through the ball cage. The curvatures form supports for the balls in the way, as appears from the drawing. If desired these curvatures may be given the form of arcs of circles of a lesser diameter than that of the balls, so that the ball cage spread in a plane gets the form of a sinusoid. The curvatures, however, may be performed, so that they extend a little more or less than 180° of the arc along which they are formed. By this means sharp bendings of the ball cage and inconveniences owing to them are avoided.

Ball cages of this kind are especially appropriate to be employed in such bearings, invented by the same inventor, as shown in Fig. 1, where the ball entries or intakes are formed by continuous diminutions, 13, 14, formed along a greater part of the opposite circumferences of the outer and inner rings 1, 2, which diminutions of the goods extend axially from the side borders of the rings toward the ball races, indicated by the dotted lines 15. The ball cage, however, may of course be advantageously used in other ball bearings.

When embodying balls and ball cages of the said construction into a bearing of the type shown in Fig. 1, I proceed as follows. At first half the number of balls are introduced into the bearing through the ball intakes, formed by the diminutions 13, 14 and are arranged so, that they correspond to every second bend or loop of the ball cage which is then pressed in from the side between the rings in a manner to make a ball come into its position in every second bend or loop. Thereupon the other balls are introduced one by one into the corresponding bend or loop of the ball cage, which every time is turned, so that the said bend, for example the bend 16, Fig. 1, be placed right against the ball intake 13, 14. In this position of the parts the ball can easily be introduced into the bearing by pressing the said bend or loop outwardly in a direction toward the outer ring. Then the bend or loop will, when relaxed, resume its normal position inclosing the ball.

Having thus described my invention, I declare, that what I claim is:

1. A ball cage for ball bearings consisting of a ring of wire formed with bends or curves extending laterally on each side of a transverse central plane passing through the ball cage, each bend being adapted to receive a ball of the ball bearing, and being formed with a radius less than that of a ball.

2. A ball cage for ball bearings consisting of a ring of wire formed with bends or curves extending laterally on each side of a transverse central plane passing through the ball cage, each bend being adapted to receive a ball of the ball bearing, said curves extending substantially equilaterally from both sides of said transverse plane, and being formed with a radius less than that of a ball.

3. A ball cage for ball bearings consisting of a ring of wire formed with bends or curves extending laterally on each side of a transverse central plane passing through the ball cage, each bend being adapted to receive a ball of the ball bearing, and forming substantially a part of a circle of lesser diameter than that of a ball.

4. A ball cage for ball bearings consisting of a ring of wire formed with bends or curves extending laterally on each side of a transverse central plane passing through the ball cage, and being adapted to receive a ball of the ball bearing, each bend having substantially the form of a semi-circle of lesser diameter than that of a ball in the manner that the ball cage gets a sinusoidal form.

5. A ball cage for ball bearings consisting of a ring of wire formed with bends or curves extending laterally on each side of a transverse central plane passing through the ball cage, each bend being adapted to receive a ball of the ball bearing, every second bend or curve having substantially the form of an annular loop.

6. A ball cage for ball bearings consisting of a ring of wire formed with bends or curves extending laterally on each side of a transverse central plane passing through the ball cage, each bend being adapted to receive a ball of the ball bearing, every second bend or curve having substantially the form of an annular loop, with a diameter less than the diameter of the balls intended to be used in connection with the ball cage, the space between said loops being each adapted to receive a part of a ball.

7. A ball cage for ball bearings consisting of a ring of wire formed with bends or curves extending laterally on each side of a transverse central plane passing through the ball cage, each bend being adapted to receive a ball of the ball bearing, each bend being substantially formed along an arc of a circle of less diameter than the balls intended to be used in connection with the ball cage, and comprising somewhat more than 180° of said circle.

8. A ball cage for ball bearings consisting of a ring of wire formed with bends or curves extending laterally on each side of a transverse central plane passing through the ball cage, each bend being adapted to receive a ball of the ball bearing, every second bend or curve having substantially the form of an annular loop, the base portions of which are connected with each other by means of a uniting member.

In witness whereof I have hereunto set my hand in presence of two witnesses.

OLOF HENNING BURSELL.

Witnesses:
G. NORDLINOH,
O. McDELIN.